United States Patent [19]

Groll

[11] Patent Number: 4,810,182
[45] Date of Patent: Mar. 7, 1989

[54] QUICK CHANGING AND QUICK GRIPPING DEVICE FOR THE MOLDING TOOLS OF INJECTION MOLDING MACHINES

[75] Inventor: Herbert Groll, Meinerzhagen, Fed. Rep. of Germany

[73] Assignee: Battenfeld GmbH

[21] Appl. No.: 114,308

[22] Filed: Oct. 27, 1987

[30] Foreign Application Priority Data

Nov. 4, 1986 [DE] Fed. Rep. of Germany ....... 3637532

[51] Int. Cl.⁴ .............................................. B29C 45/10
[52] U.S. Cl. ................... 425/190; 425/192 R; 425/574; 425/575; 425/DIG. 5; 425/595
[58] Field of Search ............... 425/182, 185, 190, 574, 425/575, 589, 595, 192 R, DIG. 5

[56] References Cited

U.S. PATENT DOCUMENTS

| | | | |
|---|---|---|---|
| 3,199,159 | 8/1965 | Wernecke | 425/595 |
| 3,394,434 | 7/1968 | Hart-Still | 425/595 |
| 4,403,810 | 9/1983 | Bieneck | 425/589 |
| 4,472,127 | 9/1984 | Cyriax et al. | 425/542 |
| 4,500,274 | 2/1985 | Cyriax et al. | 425/542 |
| 4,555,228 | 11/1985 | Nishiike et al. | 425/575 |

FOREIGN PATENT DOCUMENTS 3215567 10/1983 Fed. Rep. of Germany.
3220911 10/1983 Fed. Rep. of Germany.

Primary Examiner—Jay H. Woo
Assistant Examiner—Timothy W. Heitbrink
Attorney, Agent, or Firm—Toren, McGeady & Associates

[57] ABSTRACT

A quick changing and quick gripping device for the molding tools of injection molding machines. The two mold halves of each molding tool are alignable in insertion guides between two adapter plates located opposite each other. The adapter plates are movable toward each other for closing the molding tool and are movable apart from each other for opening the molding tool. The mold halves can be fixed in their aligned position by means of clamping members. During the changing and/or gripping procedure, the two mold halves of the closed molding tool are fixedly locked or coupled to each other. At least one locking bar is movably mounted in a mold half and automatically engages a locking bar engagement member mounted in the other mold half by means of a biasing force, such as, a spring. The locking bar includes an actuating element which projects into the range of an intermediate plate of the respective mold half, the intermediate plate being capable of being operatively connected to the clamping members. At least one of the clamping members, when moved into its clamping position, is movable against the actuating element of the locking bar and the locking bar can thus be forcibly disengaged relative to the locking bar engagement member.

7 Claims, 4 Drawing Sheets

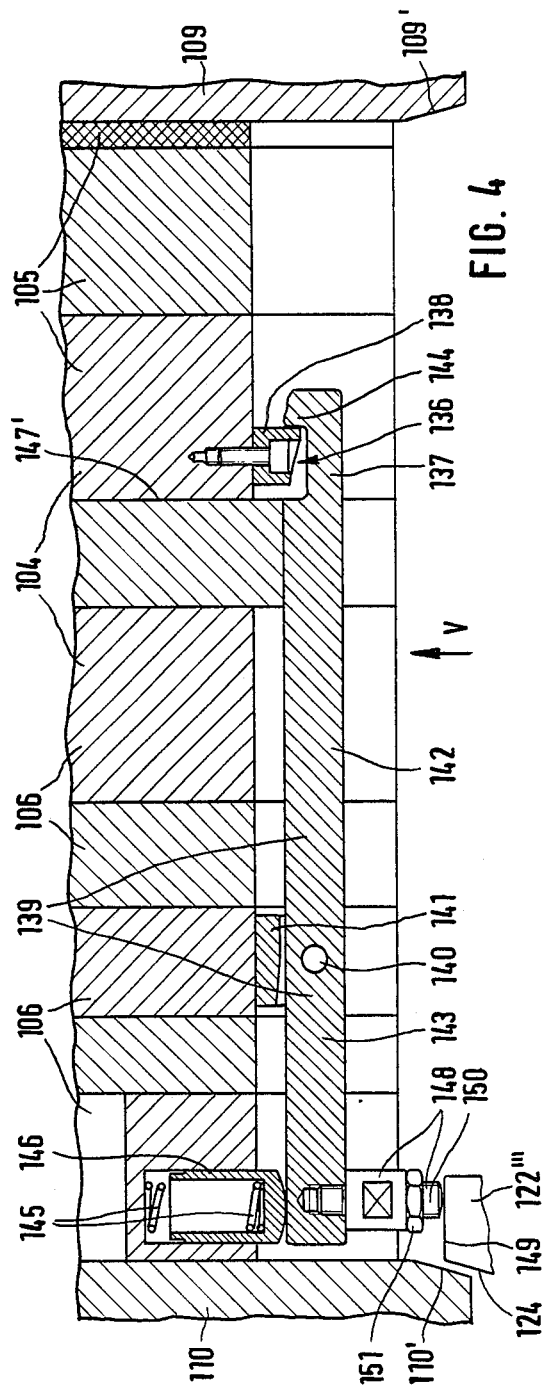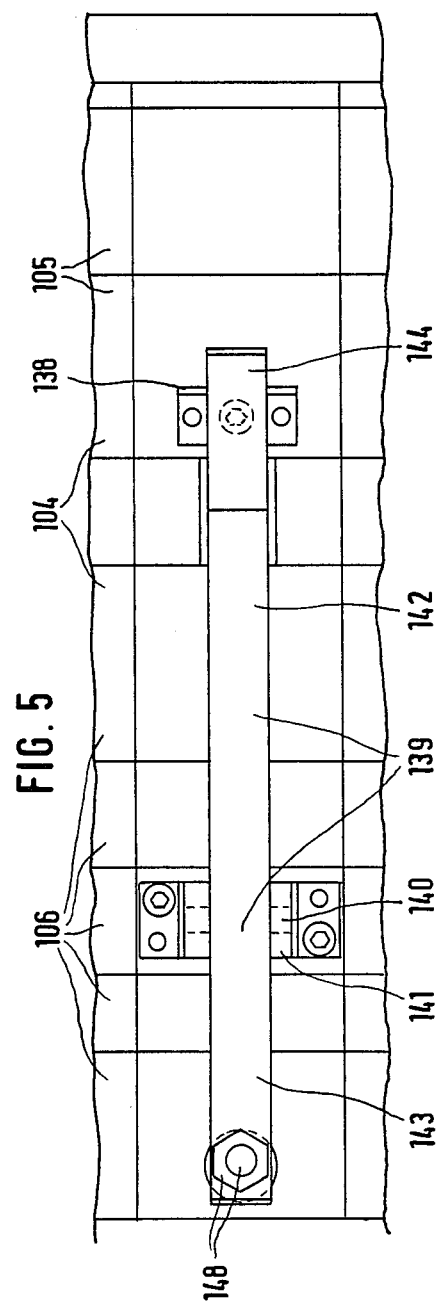

QUICK CHANGING AND QUICK GRIPPING DEVICE FOR THE MOLDING TOOLS OF INJECTION MOLDING MACHINES

BACKGROUND OF THE INVENTION

1. Field of the Invention

The present invention relates to a quick changing and quick gripping device for the molding tools of injection molding machines. The two mold halves of each molding tool are alignable in insertion guides between two adapter plates located opposite each other. The adapter plates are movable toward each other for closing the molding tool and are movable apart from each other for opening the molding tool. The mold halves can be fixed in their aligned position by means of clamping members. During the changing and gripping procedure, the two mold halves of the closed molding tool are fixedly locked or coupled to each other.

2. Description of the Prior Art

Quick changing and quick gripping devices of this type are already known. They are described, for example, in German Offenlegungsschrift No. 3,215,567.

Another type of such a quick changing and quick griping device is disclosed in German Offenlegungsschrift No. 3,220,991.

When such quick changing and quick gripping devices are used in injection molding machines, it must be ensured that, for assembling the molding tool in and disassembling the molding tool from the injection molding machine, the two mold halves are fixedly locked or coupled to each other in the closed state. A proper operation of the molding tool and a problem-free exchange of the molding tool is otherwise not possible. Accordingly, as described in German Offenlegungsschrift No. 3,215,567, the two mold halves of the molding tool can be locked to each other by means of special coupling elements, for example, in the form of swivel or insertion lugs. After assembly or before the disassembly of the molding tool, these coupling elements must be manually engaged and disengaged, so that, during operation of the injection molding machine, the two mold halves can be moved apart for opening the molding tool and can be moved toward each other for closing the molding tool. When the molding tool is to be exchanged, the two mold halves remain connected to each other.

However, it has been found that the manual operation of the known quick changing and quick gripping devices required for exchanging the molding tools is a disadvantage because this results in an increase of the time needed for a tool exchange and, thus, increases the time during which the injection molding machine is idle.

It is, therefore, the primary object of the present invention to provide a quick changing and quick gripping device in which the molding tool can be exchanged without requiring manual operations to be carried out in the injection molding machine, so that the time required for exchanging the molding tools is reduced.

Specifically, a quick changing and quick gripping device is to be provided for the molding tools of injection molding machines which ensures an automatic unlocking or uncoupling of the interacting mold halves and automatic locking or coupling of the mold halves when the molding tools are to be exchanged.

SUMMARY OF THE INVENTION

In accordance with the present invention, a quick changing and quick gripping device of the above-described type includes at least one locking bar which is movably mounted in a mold half and which automatically engages a locking bar engagement means mounted in the other mold half by means of a biasing force, for example, a spring. The locking bar includes an actuating element which projects into the range of an intermediate plate of the respective mold half, wherein the intermediate plate is capable of being operatively connected to the clamping members. At least one of the clamping members, when moved into its clamping position, is movable against the actuating element of the locking bar and the latter can thus be forcibly disengaged relative to the locking bar engagement means.

Thus, just by engaging and disengaging the clamping members which fix the mold halves in the insertion guides on the adapter plates of the injection molding machine, the mold halves can be unlocked or uncoupled from each other and can also be locked and coupled to each other, so that no manual operation is required and, accordingly, the time required for the tool exchange is not extended by a manual operation.

In accordance with a particularly advantageous feature of the present invention, the locking bar of a quick changing device is a two-armed lever which is supported on one of the mold halves of the molding tool so as to be swivelable to a limited extent about an axis which extends transversely of the direction in which the clamping members act. One of the lever arms forms or carries a locking hook which engages behind the locking bar engagement means of the other mold half. At the end of the other lever arm is mounted a pressure piece which projects into the travel path of a clamping member of the adjacent adapter plate of the injection molding machine.

It is always important in the device according to the present invention that the actuating element of the locking bar can only be in operative connection with clamping members of that adapter plate of the injection molding machine at which the clamping members are engaged last when the molding tool is assembled, but at which the clamping members are first disengaged when the molding tool is disassembled.

In accordance with another feature of the present invention, the clamping members at the adapter plates of the injection molding machine are cams which are movable parallel to the plane of the adapter plate. Each cam has conical surfaces formed thereon and is engageable and disengageable relative to the adapter plates of the mold halves by means of a pressure cylinder.

As a result of the feature mentioned above, the clamping members of the adapter plates require very little space and the injection molding machine is overall of simple construction.

In order to ensure a proper operation of the locking device, another feature of the present invention provides that the pressure piece is provided on the locking bar so as to be readjustable in the direction in which the clamping members act, so that the pressure piece can be easily adapted to the respective assembly conditions.

In accordance with yet another advantageous feature of the present invention, the spring which provides the biasing force is mounted in the mold half of the molding tool in the area of the pressure piece and acts on the locking bar through an intermediately arranged pressure sleeve.

Finally, in accordance with another advantageous feature, the locking bar engagement means and the locking hook are mounted so as to be effective at least in the vicinity of the plane which separates the two mold halves of the molding tool.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWINGS

In the drawing:

FIG. 4 is a sectional view, on a larger scale, of the essential detail of the adapter plates and of the molding tool; and FIG. 5 is a view of the detail of FIG. 4 seen in the direction of arrow V of FIG. 4.

DETAILED DESCRIPTION OF THE INVENTION

Figure 1:
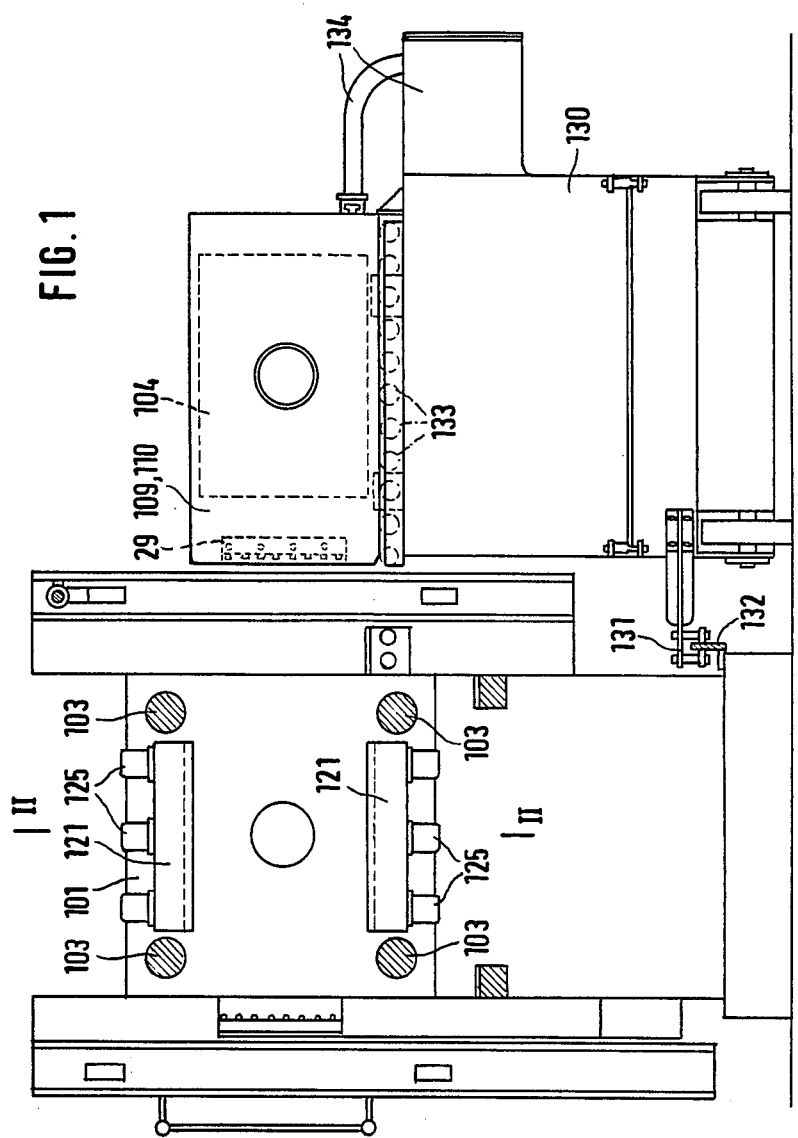
FIG. 1 is an elevational side view, partially in section, of an injection molding machine with a quick change and quick gripping device for the molding tools in accordance with the present invention.
Figure 2:
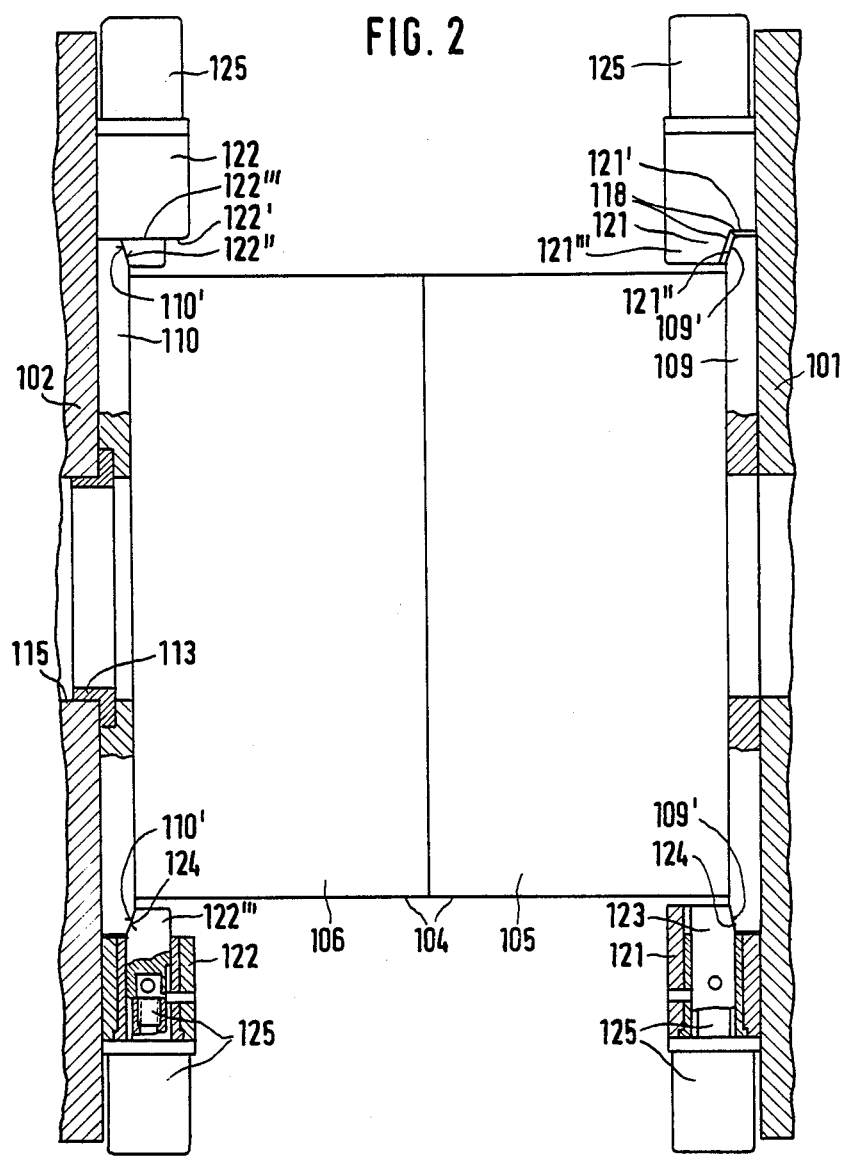
FIG. 2 is a sectional view taken along sectional line II—II of FIG. 1, with a molding tool assembled in the injection molding machine.
Figure 3:
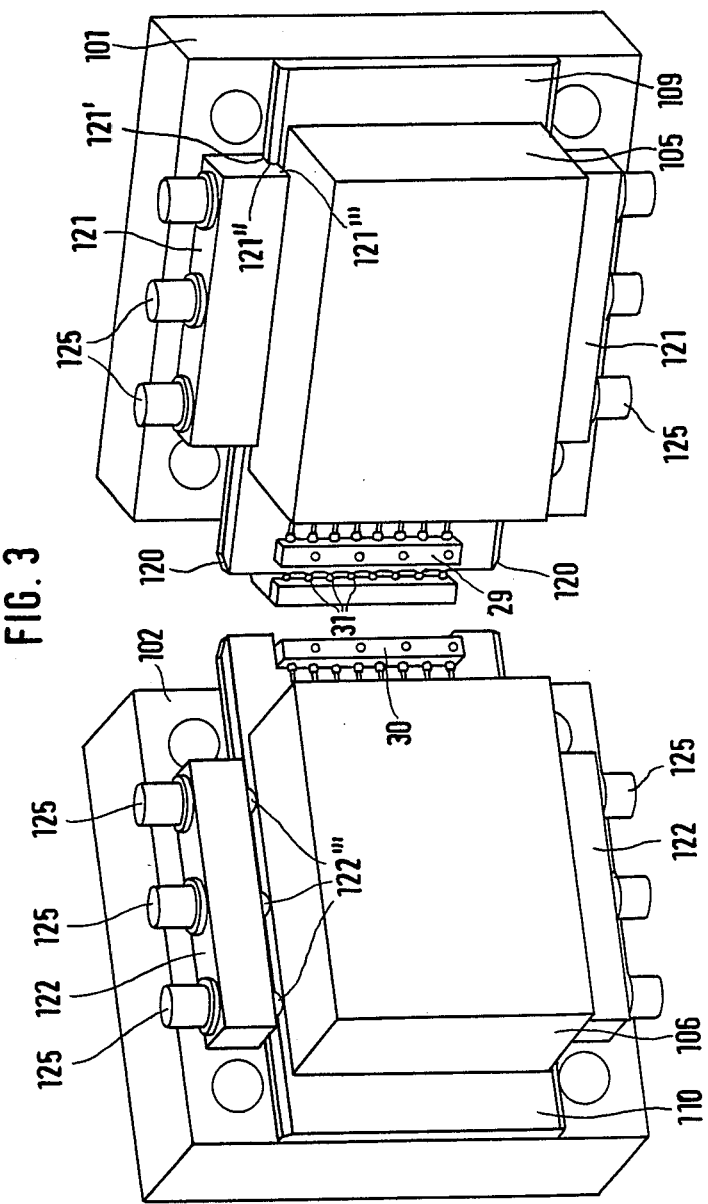
FIG. 3 is a perspective view of the two adapter plates of the injection molding machine of FIG. 2, illustrating the quick changing and quick gripping devices and the only schematically indicated two mold halves of the molding tool.

FIG. 1 of the drawing is a schematic illustration of an injection molding machine of conventional construction. The machine includes several, for example, four, rods 103 of round cross-section. Rods 103 are used for aligning and slidingly guiding an adapter plate 102 relative to adapter plate 101. The adapter plates 101 and 102 are more clearly illustrated in FIGS. 2 to 4. FIGS. 2 to 4 further show that the actual molding tool 104 is placed between the two adapter plates 101 and 102 of the injection molding machine. Molding tool 104 is essentially composed of two mold halves 105 and 106 which define the actual molding chamber.

In the injection molding machine illustrated in FIGS. 1 and 3, the molding tool 104 is exchanged preferably in horizontal direction, however, the injection molding machine can also be constructed in such a way that the molding tool can be exchanged in vertical direction.

It is important in either case that, for safety reasons, the two mold halves 105 and 106 of the molding tool 104 are locked relative to each other in the closed position of the molding tool by means of special coupling elements when the tool change is to be carried out. After the molding tool 104 has been mounted between the two adapter plates 101 and 102, the coupling elements are released, so that the two mold halves 105 and 106 can be moved apart from each other for opening the molding tool 104 or can be moved toward each other for closing the molding tool 104.

Construction and operation of these coupling elements shall be explained in more detail hereinbelow, particularly with respect to FIGS. 4 and 5 of the drawing.

As illustrated in FIGS. 2 to 4, mold half 105 of molding tool 104 is placed on a flat intermediate plate 109, while the mold half 106 is similarly mounted on a flat intermediate plate 110. The intermediate plates 109 and 110 have the same dimensions, even if the various molding tools have different dimensions.

As already mentioned, the tool exchange, i.e., the assembly or disassembly of the molding tool 104 between the adapter plates 101 and 102, is carried out horizontally from the side, particularly in a direction extending transversely of the opening and closing movements of the molding tool 104. The exchange can be carried out by means of an exchanging device which, for example, may include a carriage 130 which can be moved by means of guide members 131 along a stationary guide rail 132. Carriage 130 includes a roller conveyor 133 on which, as shown in FIG. 1, the molding tool 104 rests with the lower longitudinal edges of its adapter plates 102 and 101. Molding tool 104 may be coupled to a power-driven shifting device 134 which is also mounted on carriage 130 and serves to shift the molding tool 104 horizontally on the roller conveyor 133 into and out of the injection molding machine.

When the tool exchange is carried out, the adapter plates 101 and 102 of the injection molding machine are initially moved apart to a sufficient extent. Molding tool 104 is then moved in horizontal direction transversely of the opening and closing direction of the adapter plates 101 and 102, so that intermediate plate 109 of molding half 105 travels along the end face of adapter plate 101 and reaches the insertion guides 121. The insertion guides 121 are formed by two guide rails which are mounted opposite each other on the end face of the adapter plate 101. As FIGS. 2 and 3 show, the guide rails have guide surfaces 121' which extend parallel to the direction of insertion of the intermediate plate 109, and support surfaces 121" which engage in front of the end faces 109' of intermediate plate 109.

The support surfaces for the intermediate plate 109 are preferably projections 121''' integrally formed on the guide <rails forming the insertion guides 121. The mold intermediate 109 is movable relative to its plane into the insertion guides 121 of the adapter plate 101. The support surfaces 121" and the end face portions 109' of the intermediate plate 109 which interacts with the support surfaces 121" advantageously extend inclined relative to the end face of the adapter plate 101.

In order to facilitate the insertion of the intermediate plate 109 into the insertion guides 121 of the adapter plate 101, inclined guide surfaces 118, shown in FIG. 2, are provided at the inlet end of the insertion guide 121. The guide surfaces 118 can interact with corresponding opposite guide surfaces 120, shown in FIG. 3, provided at the insertion end of intermediate plate 109.

Guide surfaces 121' and support surfaces 121" of the insertion guides 121 formed by guide rails serve to center and align in an exact manner the intermediate plate 109 and, thus, the entire molding tool 104 parallel to and transversely of the insertion direction thereof relative to the stationary adapter plate 101.

Intermediate plate 109 is fixed on adapter plate 101 by means of clamping members in the form of cams 123 which are transversely movable and are provided with conical surfaces 124 which interact with the inclined end face portions 109' of intermediate plate 109, as clearly illustrated in FIG. 2. Cams 123 including conical surfaces 124 are movably arranged in the guide rail forming the insertion guides 21 and are actuated, preferably individually, by means of pressure cylinders 125 which are mounted on the outside of the guide rails, as clearly illustrated in FIGS. 1 and 2.

After the entire molding tool 104 has been exactly fixed through intermediate plate 109 of the mold half 105 on the stationary adapter plate 101, the movable adapter plate 102 is moved against intermediate plate 110 of the mold half 106. This has the consequence that the intermediate plate 110 cooperates through its horizontal longitudinal edges with horizontal guide surfaces 121' of insertion guides 122 formed as guide rails. The insertion guides 122 are mounted on the end face of the adapter plate 102, as shown in FIGS. 2 and 3.

Before the back side of intermediate plate 110 comes into contact with the end face of adapter plate 102, a centering projection 113 of intermediate plate 110 engages in a centering recess 115 formed in adapter plate 102, so that an exact alignment of mold half 106 on the corresponding adapter plate 102 is achieved.

Movable cams 122''' are used for final fixing of the intermediate plate 110 and, thus, of mold half 106 on adapter plate 102. Cams 122''' are guided on the guide rails forming the insertion guides 122 and form conical surfaces 124 in the same manner as the cams 123 assigned to insertion guides 121. Cams 122'' are also actuated, preferably individually, by means of pressure cylinders 125 which are mounted on the outside of insertion guides 122. Cams 122''' interact through their conical surfaces 124 with complementary inclined conical surface 110' of intermediate plate 110 and, in this manner, form effective clamping members for secure fixing of intermediate plate 110 on adapter plate 102.

As is apparent from FIGS. 2 and 3, the quick change and quick gripping device according to the invention is of simple construction and requires little space. Therefore, the device can be used also in connection with molding tools 104 which have only a small structural height.

FIGS. 4 and 5 of the drawing show, in connection with molding tool 104, one of the coupling elements already briefly referred to above, the coupling element being used for locking the two mold halves 105 and 106 of the molding tool 104 relative to each other when the tool exchange is to be carried out.

Each of the coupling elements 136 includes a locking bar 137 and a corresponding locking bar engagement member 138.

While the locking bar engagement member 138 is constructed, for example, in the form of a lock and is mounted on the bottom side of mold half 105, locking bar 137 is formed by a two-armed lever 139 which is swivelable to a limited extent about an axis 140 and is supported in a bearing member 141 on the bottom side of mold half 106. A lever arm 142 of the two-armed lever 139 is assigned to the locking bar engagement member and forms or carries a locking hook 144 which is capable of engaging behind locking bar engagement member 138.

The other lever arm 143 of the two-armed lever 139 ends closely adjacent intermediate plate 110 of mold half 106 and is biased by means of a biasing force, for example, a spring 145, over a pressure sleeve 146 slidably guided in mold half 106.

The biasing force for compression spring 145 biases the locking hook 144 of locking bar 137 to be in continuous engagement with the locking bar engagement member at the mold half 105 and to fixedly couple the two mold halves 105 and 106 of the molding tool 104.

It has been found particularly advantageous if the locking bar engagement member 138 and the locking hook 144 of locking bar 137 of coupling element 136 are mounted so as to be effective in the vicinity of the plane separating the two mold halves 105 and 106 of the molding tool 104, wherein the separating plane of the molding tool 104 may either be plane 147' or plane 147'' shown in FIG. 4.

To ensure that the coupling elements 136 between the two mold halves 105 and 106 of each molding tool 104 are disengaged in an automatic and forcible manner as soon as the molding tool 104 has been properly fixed between the two adapter plates 101 and 102, lever arm 143 of the locking bar 137 interacts through an adjustable pressure piece or actuating element 148 with the movable cams 122'' arranged in the region of the insertion guides 122 of adapter plate 102 for fixing the intermediate plate 110.

As soon as cams 122''' have been moved by pressure cylinders 125 to generate a clamping action, these cams 122''' act with their free end faces 149 on the pressure piece 148 and, thus, swivel the two-armed lever 139 about axis 140 against the biasing force of spring 145. As a result, locking hook 144 of locking bar 137 is forcibly disengaged from the locking bar engagement member 136. Accordingly, as soon as cams 122''' make contact with their conical surfaces 124 with the complementary conical surfaces 110' of intermediate plate 110 and generate a clamping force, the two mold halves 105 and 106 of the molding tool 104 are also uncoupled and the molding tool 104 can now be operated.

As FIGS. 4 and 5 of the drawing further show, pressure piece 148 includes a pressure bolt 150 which can be readjusted and locked in any position of adjustment by means of a counternut 151, so that pressure piece 148 can be moved in an optimum manner into the range of action of the movable cam 122'''.

In accordance with another embodiment of the present invention which differs from the embodiment shown in FIGS. 4 and 5, the direction of operation of the coupling elements 136 may also be turned by 90°, so that the two-armed lever 139 forming the locking bar 137 is swivelable about axis 140 not in a vertical plane, but on a horizontal plane. In that case, cams 122''' should act on pressure piece 148 of the two-armed lever 139 through a conical surface of cam 122''' which is similar to conical surface 124, but turned by 90° relative to conical surface 124.

While a specific embodiment of the invention has been shown and described in detail to illustrate the application of the inventive principles, it will be understood that the invention may be embodied otherwise without departing from such principles.

I claim:

1. A quick changing and quick gripping device for a molding tool of an injection molding machine, the molding tool having two mold halves, the injection molding machine having insertion guides and two adapter plates located opposite each other, the mold halves being alignable in the insertion guides between the two adapter plates, the adapter plates being movable toward each other for closing the molding tool and movable apart from each other for opening the molding tool, clamping members for fixing the mold halves in their aligned position, locking means for fixedly locking the two mold halves of the closed molding tool together during the changing and gripping procedure, wherein the improvement comprises at least one locking bar movably mounted in one of the mold halves, a locking bar engagement means mounted in the other mold half, a biasing means for automatically engaging the locking bar in the locking bar engagement means, each mold half provided with an intermediate plate with a surrounding range, the intermediate plates being capable of being operatively connected to the clamping members, the locking bar including an actuating element, the actuating element projecting into the range of the intermediate plate of the one of the mold halves, wherein at least one of the clamping members, when moved into its clamping position, is movable against the actuating element of the locking bar, so that the locking bar can be forcibly disengaged relative to the locking bar engagement means.

2. The device according to claim 1, wherein the biasing means is a spring.

3. The device according to claim 1, wherein the locking bar is a two-armed lever, the two-armed lever being mounted on the one of the mold halves of the molding tool so as to be swivelable to a limited extent about an axis which extends transversely of the direction in which the clamping members act, one of the lever arms forming a locking hook which engages behind the locking bar engagement means of the other mold half, a pressure piece mounted at the end of the other lever arm, the pressure piece projecting into the travel path of the clamping member of the adjacent adapter plate of the injection molding machine.

4. The device according to claim 1, wherein the clamping members at the adapter plates of the injection molding machine are cams which are movable parallel to the plane of the adapter plate, each cam having conical surfaces formed thereon and being engageable and disengageable relative to the adapter plates of the mold halves by means of a pressure cylinder.

5. The device according to claim 3, wherein the pressure piece is mounted on the locking bar so as to be readjustable in the direction in which the clamping members act.

6. The device according to claim 3, wherein the biasing means is a compression spring, the compression spring being mounted in the one of the mold halves of the molding tool in the region of the pressure piece, the compression spring acting on the locking bar through an intermediate pressure sleeve.

7. The device according to claim 3, wherein the locking bar engagement means and the locking hook are mounted so as to be effective at least in the vicinity of the plane which separates the two mold halves of the molding tool.

* * * * *